United States Patent [19]

Baudin

[11] 4,093,828

[45] June 6, 1978

[54] SWITCHING NETWORKS, E.G. SPACE-DIVISION CONCENTRATORS

[75] Inventor: Jacques Baudin, Lannion, France

[73] Assignee: Societe Lannionnaise d'Electronique SLE-Citerel S. A., Lannion, France

[21] Appl. No.: 730,117

[22] Filed: Oct. 6, 1976

[30] Foreign Application Priority Data

Oct. 15, 1975 France .............................. 75 31590

[51] Int. Cl.$^2$ ...................... H04Q 3/42; H04Q 3/60
[52] U.S. Cl. ........................ 179/18 FC; 179/18 GF
[58] Field of Search ........ 179/18 FC, 18 GE, 18 GF, 179/15 AQ

[56] References Cited

U.S. PATENT DOCUMENTS

| | | | |
|---|---|---|---|
| 3,311,705 | 3/1967 | Le Corre et al. .............. | 179/18 FC |
| 3,700,819 | 10/1972 | Marcus ........................... | 179/18 GF |
| 3,851,124 | 11/1974 | Garavalia ...................... | 179/18 GF |
| 4,009,468 | 2/1977 | Calcagno et al. ............. | 179/18 FC |

*Primary Examiner*—Thomas A. Robinson

*Attorney, Agent, or Firm*—Sughrue, Rothwell, Mion, Zinn and Macpeak

[57] ABSTRACT

A switching network comprises a matrix of cross-point switches disposed in a pattern at selected ones of the cross-points in an array of mutually othogonal inlets and outlets. The pattern of selected cross-points is built up from a rectangular array of basic layouts each comprising eight cross-point switches distributed among the 16 cross-points which is formed by a group of four consecutive inlets crossing a row of four consecutive outlets. There are two types of basic layout: an A-type having its switches at the outer cross-points of its odd numbered lines and at the inner cross-points of its even numbered lines, and a B-type having its switches at the other cross-points. The basic layouts are disposed in a binary pattern over the matrix such that the matrix has a first line of alternating types of layout, a second line of alternating pairs of layout types etc.; each $n$-th line having its layouts in sets $2^{n-1}$ layouts of each type. This arrangement is particularly suitable for two-stage space-division concentrators using analog multiplexers to constitute lines of outlet switches.

14 Claims, 12 Drawing Figures

SWITCHING NETWORKS, E.G. SPACE-DIVISION CONCENTRATORS

The present invention relates to switching networks and particularly, but not exclusively, to space-division concentrators for concentrating traffic from telephone users.

BACKGROUND OF THE INVENTION

Electronically controlled space-division concentration systems generally use electromechanical relay matrices or reed relay matrices. The disadvantages of such systems are mainly related to price and bulk; in a telephone concentrator the relay matrices account for about half the price and the volume of the equipment and it does not seem possible to hope for a substantial improvement to this situation, with this type of equipment.

This is why a great amount of work has been done aiming at using integrated circuits to embody space concentration. Two families of components can mainly be used for this application, namely, PNPN thyristors and field effect transistors of the metal-oxyde-semiconductor (MOS) type or complementary (C-MOS) transistors. Existing thyristor cross points are capable of withstanding voltages in the order of 50 to 100 volts and currents of a few tens of milliamperes, this being insufficient for transmitting the supply current of the line nor the ringing current with the necessary safety margin. It is therefore indispensable to separate the signalling and transmission functions, as is the case also with cross points formed by MOS transistors, but further, the control circuits for the thyristor cross points are more complex because the direct holding current of the connection systems must be injected and extracted and the interfaces of connection with conventional TTL or MOS integrated circuits are not easy to produce.

C-MOS complementary transistors have electric characteristics enabling them to fulfill transmission, crosstalk and distortion requirements. This is why thyristors are at present substituted in some embodiments by MOS and C-MOS transistors with which it is possible to produce space-division matrices whose cross points are MOS or C-MOS transistors; such matrices formed by integrated circuits are also currently found in trade.

Quite obviously, the cross points are fixed and such matrices do not provide full versatility of use necessary for producing concentrators; the addressing of these matrices in particular must take into account all the cross points of the matrix.

The invention concerns a space concentrator using C-MOS integrated circuits but not having the drawbacks of known space matrices.

The object of the present invention is to provide a switching network which can readily be embodied with presently available integrated circuits and in particular, preferred embodiments of the present invention provide versatile concentrator modules having several applications. Indeed, if a telephone exchange is arranged to accept plug-in modules according to preferred embodiments of the present invention then the same modules can be used interchangeably as first or second stage switches in a two-stage network and can also be used interchangeably with callers of differing calling rates; all the necessary arrangements particular to the switching stage or to the calling rate being made in the exchange wiring external to the concentrator module.

The present invention provides a switching network comprising a matrix of cross-point switches disposed in a pattern at selected ones of the cross-points in an array of mutually orthogonal inlets and outlets, wherein the pattern of selected cross-points is built up from a rectangular array of basic layouts each comprising eight cross-point switches distributed among the sixteen cross-points formed by a group of four consecutive inlets crossing a row of four consecutive outlets; the basic layouts being of two types; a first type having its switches at the outer cross-points of its odd numbered lines and at the inner cross-points of its even numbered lines and a second type having its switches at its other cross-points; basic layouts of both types being disposed in a pattern over the array in such a manner that all the cross-point switches are arranged in a single matrix not equivalent to a plurality of separate matrices with interleaved inlets and outlets.

The pattern of basic layout types is preferably a binary pattern such that the matrix has a first line of alternating types of layout, a second line of alternating pairs of layout types and so on each n-th line having its layouts in sets of $2^{n-1}$ layouts of each type.

Preferably the last line is composed entirely of layouts of one type. The lines of the matrix are preferably constituted by rows of outlets and the lines of the basic layouts by their outlets.

In a preferred application the switching network is a concentrator having a greater number of inlets than outlets, say 32 to 16 giving a concentration factor of 2.

A plurality of switching networks may be connected with their outlets commoned together to provide a greater degree of concentration.

At least some pairs of adjacent inlets or alternatively pairs of adjacent outlets may be connected together to provide at least some inlets having full access to all the outlets or outlets having full access to all the inlets as the case may be.

The outlets are preferably constituted by analogue multiplexers e.g. integrated circuit packages having analogue switches in the form of MOS transistors.

Two stages of switching network may be provided and with suitable design devices it can be arranged that a single plug-in design of modular switch matrix can be used in all parts of the two stage network including parts which are intended for heavy traffic since the requisite pairing of inlets or outlets can be performed externally to the switch matrix.

Embodiments of the invention are described by way of example with reference to the accompanying drawings in which.

Figure 3:
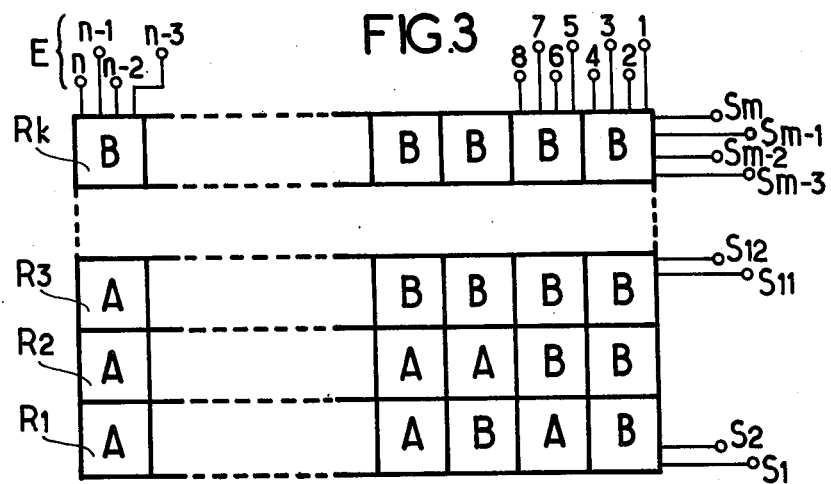
Figure 4:
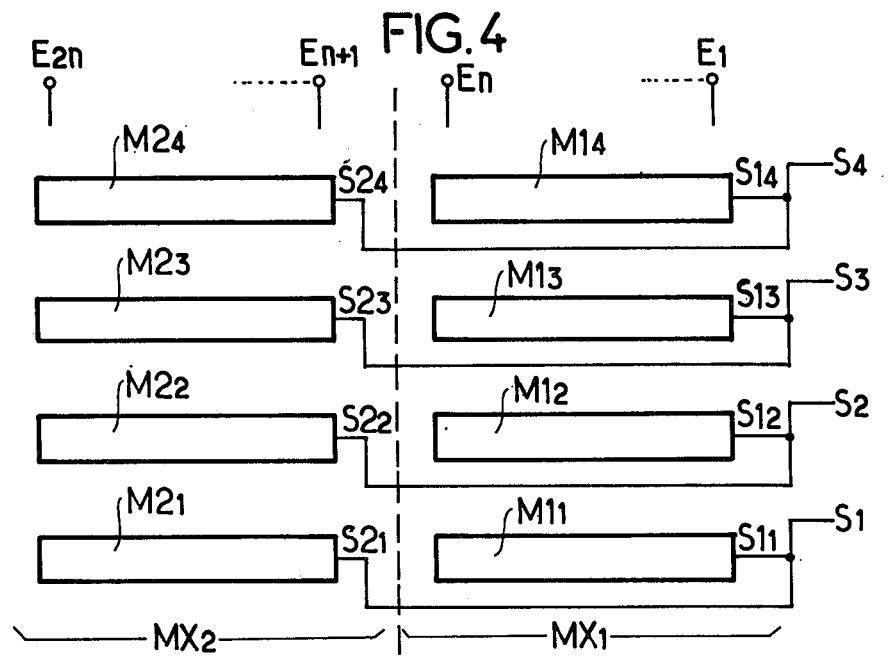
Figure 5:
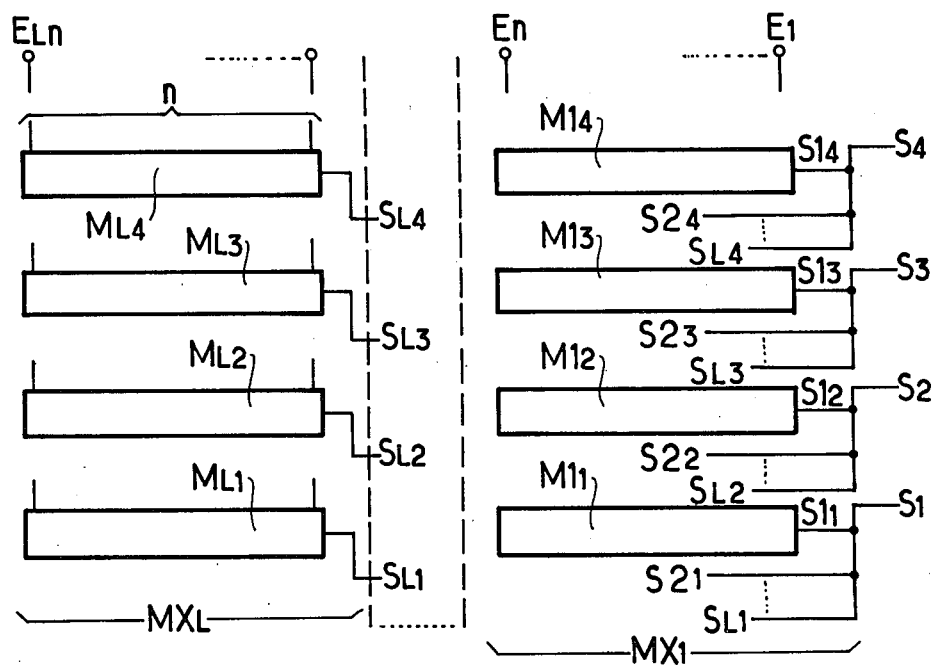
Figure 6:
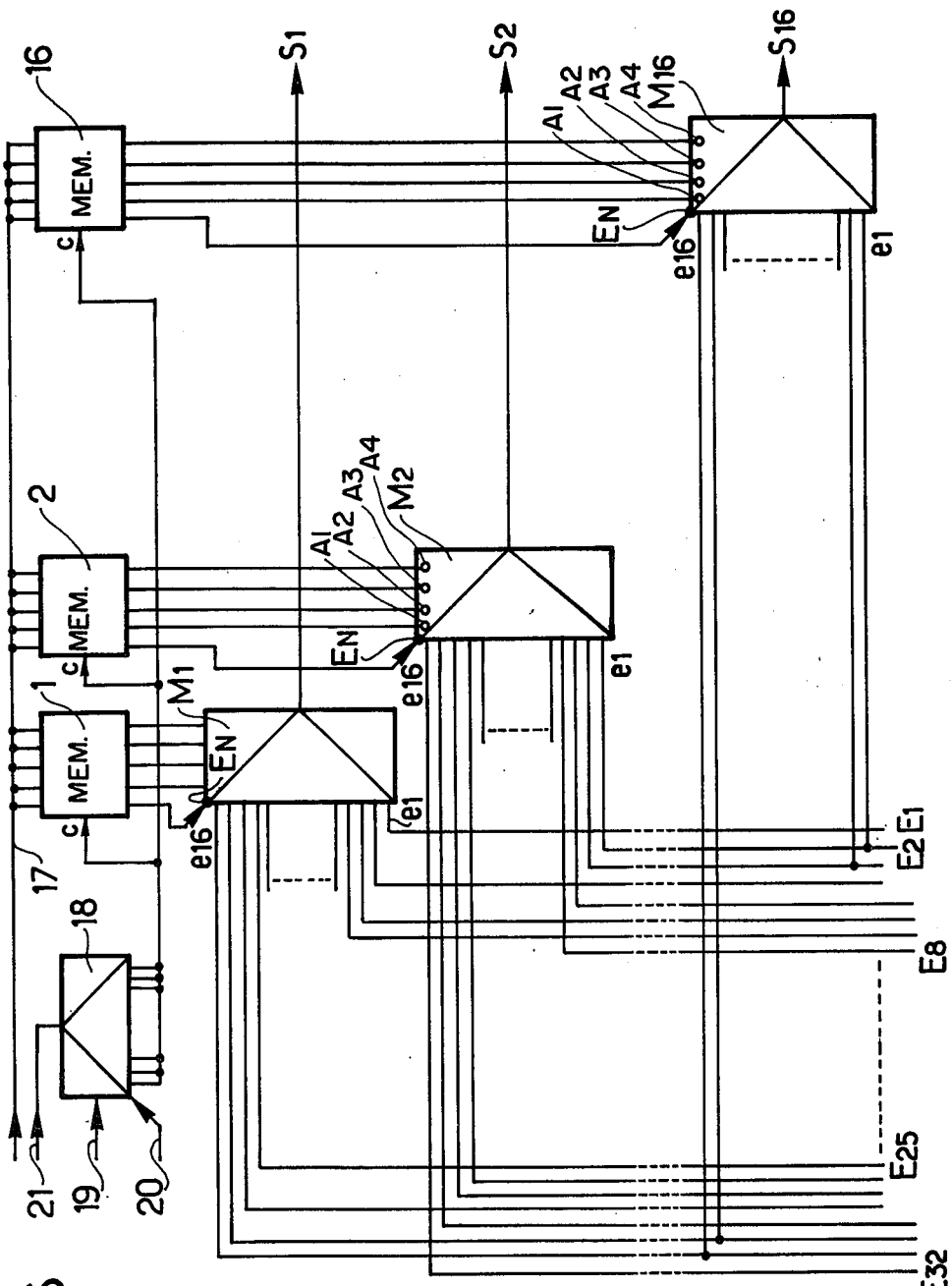
Figure 7:
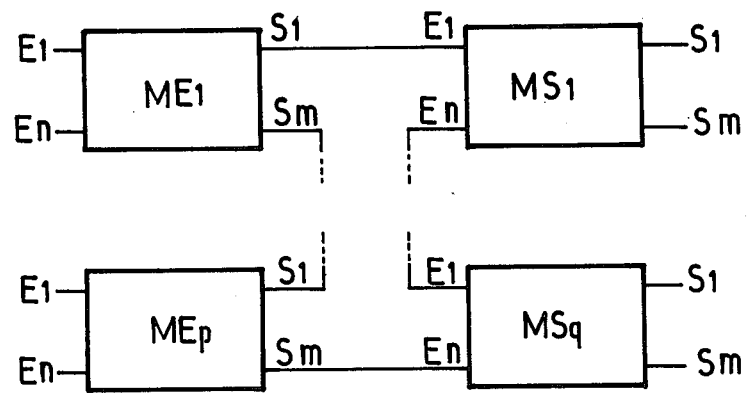
Figure 8:
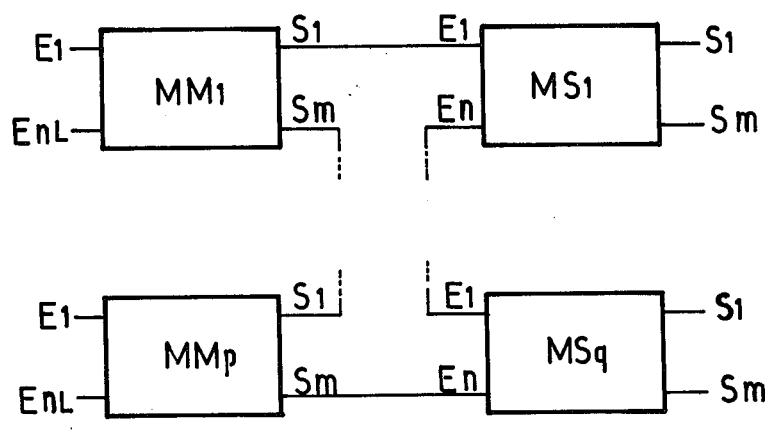
Figure 9:
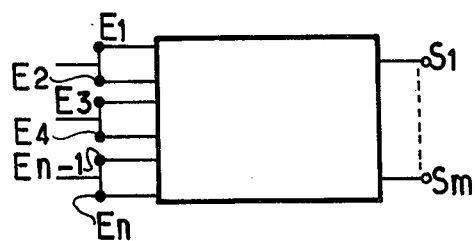
Figure 10:
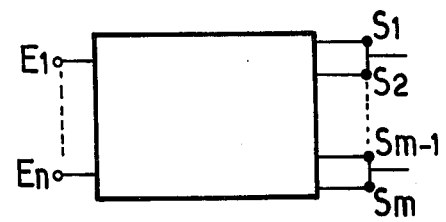
Figure 11:
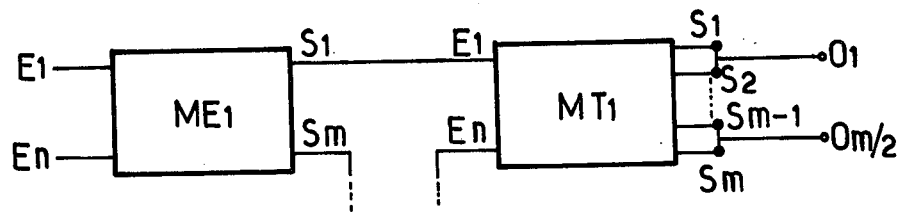
Figure 11:
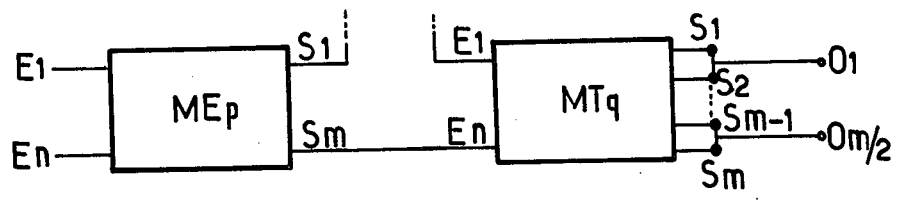
Figure 12:
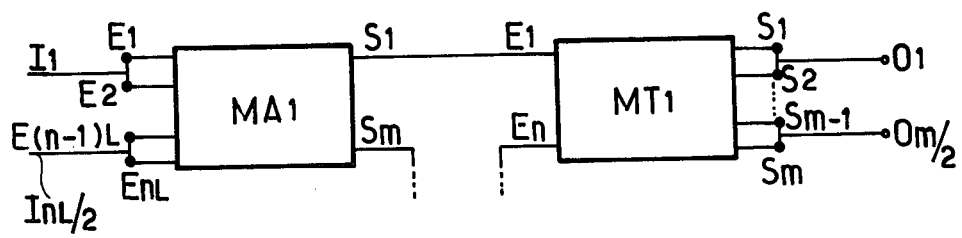
Figure 12:
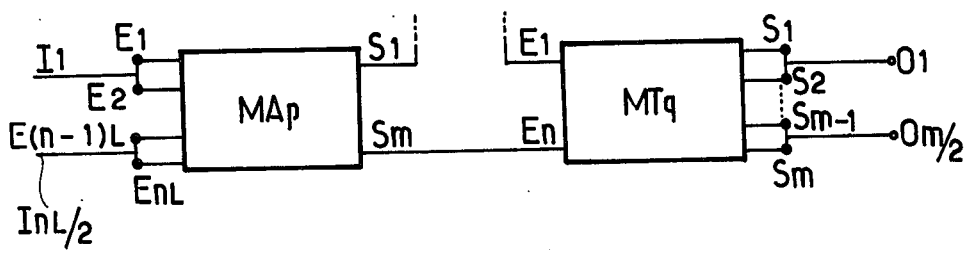

FIG. 3 also shows a matrix;

FIG. 4 shows the first row of a multiple matrix constituted by two matrices;

FIG. 5 shows the first row of a multiple matrix constituted by L matrices;

FIG. 6 is a diagram of the embodiment of a matrix;

FIG. 7 is a two-stage space concentrator;

FIG. 8 is another embodiment of a two-stage space concentrator;

FIG. 9 is a matrix with full access by rearrangement of the inlets;

FIG. 10 is a matrix with full access by rearrangement of the outlets;

FIG. 11 is a further embodiment of a two-stage space concentrator;

FIG. 12 is yet another embodiment of a two-stage space concentrator.

Figure 2:
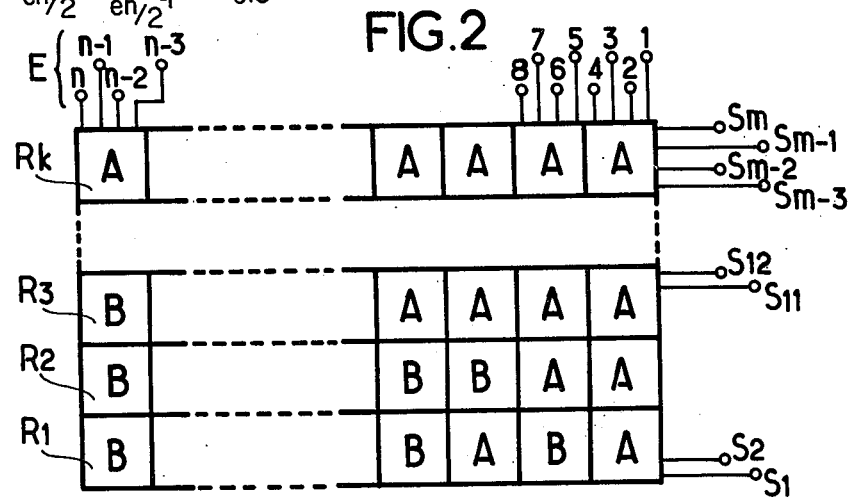
FIG. 2 shows a matrix.

With reference to FIG. 2 a matrix has $k$ rows R1 to R$k$ each of which is constituted by four analogue multiplexers. Typically each analogue multiplexer is constituted by a single integrated circuit having, say, sixteen signal inputs, one signal output, four address inputs for selecting one of the signal inputs for connection to the signal output and such power leads, enable inputs etc. as may be necessary.

Figure 1:
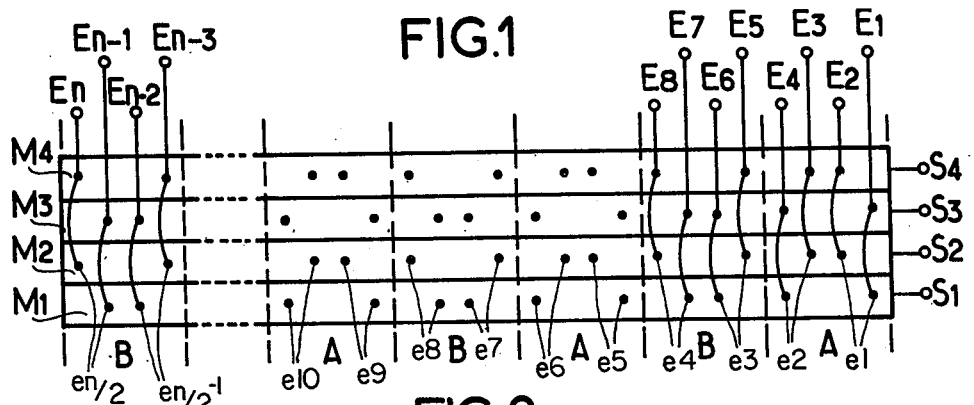
FIG. 1 shows the connection of the first row of a matrix.

The first row R1 is shown in greater detail in FIG. 1 where it can be seen that four analogue multiplexers M1 to M4 have four respective outputs S1 to S4 and that each multiplexer is connected to half of the matrix inlets E1 to E$n$. The arrangement of the connections between the inlets E and the multiplexers M is in groups of four inlets by four multiplexers (i.e. by four matrix outlets). The arrangement follows one of two patterns referred to as basic layouts of types A and B. In both basic layouts each of the four inlets has access to two multiplexers, while each multiplexer has access to two of the four inlets.

In FIG. 1 the four multiplexers M1, M2, M3 and M4 each having $n/2$ inputs numbered e1 to e$n/2$, are connected to the $n$ inlets E1, E2 ... E$n$ of the matrix as follows: the first and third analogue multiplexers have their inputs e1, e2, ... e$n/2$ connected to inlets E1, E4, E6, E7, E9, E12, E14, E15, E17, E20, ... E$n-2$, E$n-1$, respectively, while the second and fourth analogue multiplexers have their inputs e1, e2, ... e$n/2$ connected to the other n/2 inlets of the matrix, i.e. E2, E3, E5, E8, E10, E11, E13, E16, E18, E19, ..... E$n-3$, E$n$. If groups of four inlets of the matrix E1 to E4, E5 to E8, E9 to E12, ... E$n-3$ to E$n$, are taken into consideration, it will be seen that the arrangement of the connections between the analogue multiplexers and these inlets forms basic layouts of two types A and B and that these basic layouts alternate, the first row R1 beginning with a basic layout of type A and ending with a basic layout of type B. A basic A or B type layout is formed by taking an odd input and the following even input in each of the four analogue multiplexers of a row, the even and odd inputs of these analogue multiplexers being homologous i.e. having the same number in each of the analogue multiplexers. Thus FIG. 1 shows the basic A type layout connected to the inlets E1 to E4 constituted by inputs 1 and 2 of the analogue multiplexers M1 to M4; the basic B type layout connected to inlets E5 to E8 is constituted by inputs 3 and 4 of the analogue multiplexers M1 to M4. The even and odd inputs have been staggered in the analogue multiplexers only for clearness' sake in the drawing.

A basic type A layout is obtained by connecting a group of four matrix inlets, e.g. E1 to E4, to the analogue multiplexers as follows: the first inlet E1 of the group is connected to the first (i.e. an odd) input of the first and third analogue multiplexers M1 and M3, while the fourth inlet E4 of the group is connected to the second (i.e. an even) input of the first and third analogue multiplexers M1 and M3; the second inlet E2 of the group is connected to the first (i.e. an odd) input of the second and fourth analogue multiplexers M2 and M4 while the third inlet E3 of the group is connected to the second (i.e. an even) input of the second and fourth analogue multiplexers M1 and M4.

A basic B type layout is formed by connecting a group of four inlets, e.g. E5 to E8, of the matrix to the analogue multiplexers as follows: the first inlet E5 of the group is connected to the third (i.e. an odd) input of the second and fourth analogue multiplexers M2 and M4, while the fourth inlet E8 of the group is connected to the fourth (i.e. an even) input of the second and fourth analogue multiplexers M2 and M4; the second inlet E6 of the group is connected to the third (i.e. an odd) input of the first and third analogue multiplexers M1 and M3 while the third inlet E7 of the group is connected to the fourth (i.e. an even) input of the first and third analogue multiplexers M1 and M3.

A basic A type or B type layout therefore has four matrix inlets and four matrix outlets, the outlets being the outputs of the four analogue multiplexers; as a basic layout is constituted by two successive inputs, namely an odd input and an even input, of each of the four multiplexers, there are therefore a total of eight analogue multiplexer inputs which constitute eight cross-points of the basic layout; a basic layout can therefore be considered as an elementary matrix having four inlets and four outlets in which one cross-point in two is used. Lastly, a row comprises $n/4$ basic layouts, since each analogue multiplexer has $n/2$ inputs and each basic layout has two inputs of each analogue multiplexer of the row.

A basic B type layout is derived from the basic A type layout, by inverting the connections between the first two inlets of a group of inlets of the matrix with the odd inputs of the analogue multiplexers M1, M3 and M2, M4 and by inverting the connections between the last two inlets of a group of inputs of the matrix with the even inputs of the analogue multiplexers M1, M3 and M2, M4. Of course, the row of four analogue multiplexers of FIG. 1 could begin by a basic B type layout and end by a basic A type layout, making the basic layouts of both types alternate. The first row has four outputs S1, S2, S3, S4 which are those of the analog multiplexers M1 to M4 and in both the cases in question, i.e. the row beginning by a basic A type or B type layout, each inlet E1 to E$n$ of the matrix has access to two analogue multiplexers and hence to two outlets.

FIG. 2 shows a matrix comprising $k$ rows R1 to R$k$, each row comprising four analogue multiplexers and all the rows having the same number $n/4$ of basic layouts. The outlets of the matrix are referenced S1, S2, S3, ... S$m-1$, S$m$. The matrix is constituted by basic layouts arranged according to a binary rule, this meaning that the number of basic layouts of one type at the beginning of each row doubles from one row to the next and that in each row, this number of basic layouts of one type is followed by the corresponding number of basic layouts of the other type and so on until the row is complete. Thus, in FIG. 2, the rows R1, R2, R3 ... comprise at the beginning one, two, four ... basic A type layouts; the row R1 then follows with one basic B type layout, the row R2 following with two basic B type layouts, the row R3 with four basic B type layouts etc. The last row has $n/4$ basic layouts and this number must correspond to twice the number $a$ of basic layouts of the type by which the preceding row begins; the number $n/4$ is therefore equal to $2a$ and the number $n$ of matrix inlets is equal to $2a \times 2$. If the number of matrix inlets is defined as $n = 2^x$, the number of basic layouts of a row is equal to $2^{x-2}$; the number of basic layouts of one type at the beginning of a row is given by $2^y$, $y$ being equal to the order, i.e. to the number of the row in question less one, this giving, at the beginning of the first row $2^0 = 1$ basic layout of one type, at the beginning of the second row $2^1 = 2$ basic layouts of the same type and in the last row $2^y = 2^{k-1}$ basic layouts of the same type, $k$ being the order of the last row. As this number $2^{k-1}$ must be equal to $n/4$ i.e. to $2^{x-2}$ the result is that $k - 1 = x - 2$ and that the number $k$ of rows of a matrix is equal to $x - 1$.

Each row therefore has successively $2^y$ basic type A layouts, $2^y$ basic layouts of type B, then $2^y$ basic type A layouts and so on until the row is complete. Of course, the rows of the matrix can begin by basic type B layouts and then the $2^y$ basic type B layouts and the $2^y$ basic type A layouts are alternated as shown in FIG. 3. The constitution of the matrix of FIG. 3 is identical to that of FIG. 2, since it is sufficient to interchange the basic layouts of types A and B in FIG. 2 to obtain FIG. 3. Further, the definition of the matrix does not require any precondition concerning the type of basic layouts constituting the beginning of each row.

In these two FIGS. 2 and 3, the number $m$ of outlets of the matrix is equal to $4k$, since there are $k$ rows each having four analogue multiplexers; the outlets of the matrix are therefore numbered from S1 to S$m$, the outlets S1, S2, S3, S4 being those of the first row R1, the outlets S$m$ − 3, S$m$ − 2, S$m$ − 1, S$m$ being those of the last row R$k$.

In practice, matrices having at least three rows will be used, such a matrix having 16 inlets and 12 outlets having a concentration ratio of 16/12, i.e. 4/3. However, since analogue multiplexers having 16 inputs are commonly found in trade and since an analogue multiplexer is connected to only $n/2$ inlets of the matrix, matrices having four rows, with 32 inlets and 16 outputs will most commonly be formed, this giving a concentration ratio of 2. The number of inlets to a matrix is therefore to some extent a function of the available types of analogue mutliplexers; if it is assumed that with available analogue multiplexers, it is possible to form a matrix having $n$ inlets each connected to an input line, it will be necessary to use several matrices if the number of input lines is greater than the number $n$.

FIG. 4 shows the connection of eight multiplexers of a row of a multiple matrix constituted by two identical matrices MX1 and MX2; these are of course the eight multiplexers belonging to the same row e.g. the first row in each matrix. The matrix MX1 has analogue multiplexers M11, M12, M13, M14 which are connected to the $n$ inlets E1 to E$n$ of the matrix MX1; the matrix MX2 has multiplexers M21, M22, M23, M24 which are connected to the $n$ inlets E$n$ + 1 to E2$n$ of the matrix MX2; the outlets S21, S22, S23, S24 of the analogue multiplexers of the matrix MX2 are connected respectively to the outlets S11, S12, S13, S14 of the analogue multiplexers of the matrix MX2; thus, the outlets S1, S2, S3, S4 of the row are obtained, these outlets being common to both matrices MX1 and MX2. The same process is used for all the rows of matrices MX1 and MX2. More generally, as shown in FIG. 5 which shows the first row of a multiple matrix, L matrices MX1 to MXL will be used and outlets S11, S21 . . . SL1 of analogue multiplexers M11 to ML1, outlets S12, S22 . . . SL2 of analogue multiplexers M12 to ML2, outlets S13, S23 . . . SL3 of analogue multiplexers M13 to ML3, the outlets S14, S24 . . . SL4 of analogue multiplexers M14 to ML4, are connected between them in each row and the same process is used for all the rows of the matrices MX1 to MXL. The outlets S1, S2, S3, S4 of the row are thus obtained, these outlets being common to all the matrices MX1 to MXL. The number of inlets of the assembly of L matrices is equal to $n$L, this making it possible to connect as many input lines.

The concentration ratio of such an assembly of L matrices is L times the concentration ratio of one matrix, since each output of this assembly of L matrices is common to L matrices.

FIG. 6 is a diagram of embodiment of a 32-input matrix constituted by sixteen analogue multiplexers M1, M2 . . . M16 each having sixteen inputs numbered from $e$1 to $e$16. The matrix inlets are numbered E1 to E32 and it has 16 outlets S1 to S16 which correspond respectively to the outputs of the analogue multiplexers M1 to M16. The analogue multiplexers which are grouped in fours to constitute rows and the inputs $e$1 to $e$16 of each of the sixteen analogue multiplexers are connected to the inlets E1 to E32 of the matrix, as has been described with reference to FIGS. 1 and 2 in which it is assumed that $n = 32$ and $m = 16$, this giving $k = 4$ for the number of rows. Each analogue multiplexer M1 to M16 is associated with a respective memory 1, 2, 3 . . . 16. Each memory has five memory cells each corresponding to one bit; the input of each memory cell is connected to a bus 17 having five wires, one per bit; data concerning the connections to be made is transmitted by the bus; the data is multiplexed in time and stored in the memories 1, 2 . . . 16. Four memory cells are used in a memory for the address of the connection to be made in the related analogue multiplexer and are connected respectively to the addressing inputs A1, A2, A3, A4 of the analogue multiplexer; one memory cell is connected to the input EN for activation of the analogue multiplexer. A digital demultiplexer 18 receives via a bus 19 the addresses of the analogue multiplexer to be activated; this digital demultiplexer is activated by a signal transmitted by a wire 20. The digital demultiplexer has 16 outputs, i.e. one per analogue multiplexer; these outputs are connected respectively to a control input C for the memories 1 to 16; the digital demultiplexer 18 also receives clock signals via a wire 21.

Of course, it is possible as described with reference to FIG. 3, to form basic type B layouts at the beginning of each row of the matrix; in this case the inputs $e$1 to $e$16 of the sixteen analogue multiplexers are connected to the 32 inlets E1 to E32 according to FIG. 3.

The arrangement of the basic A and B type layouts is such that in a two-stage assembly having the outlets of a first stage layout connected to the inlets of a second stage layout, there is always some possible path between any inlet of the first stage to any outlet of the second stage regardless of the type of layout (A or B) of either stage. This feature of the A and B type layouts ensures that in a two-stage assembly of matrices such as those shown in FIGS. 1 to 6 all the inlets to the first stage have access to all the outlets of the second stage. Naturally blocking can still occur in use because of already established connections using the links that could be used to provide any desired particular connection. FIG. 7 shows a space concentrator having two stages of matrices, the matrices being identical. The first stage is constituted by $p$ matrices ME1 to ME$p$ and the second stage is constituted by $q$ matrices MS1 to MS$q$; these matrices are of the type shown in FIG. 2 or 3. The matrices ME1 to ME$p$ and MS2 to MS$q$ all have the same number $n$ of inlets referenced E1 to E$n$ and the same number $m$ of outlets referenced S1 to S$m$. Matrices ME1 to MEp are connected by their outlets to the inlets of the matrices MS1 to MSq in a regular cross-connected configuration as is known for connection systems, so that each matrix ME1 to MEp is connected by at least one connection to each matrix MS1 to MSq.

FIG. 8 shows a space concentrator with two stages of matrices; the multiple matrices MM1 to MMp of the first stage are each constituted by L matrices of the type shown in FIG. 2 or 3, the L matrices being interconnected as shown in FIG. 5; the matrices MS1 to MSq of the second stage are also of the type shown in FIG. 2 or 3. The multiple matrices MM1 to MMp each have $n$ L inlets referenced E1 to E$n$L and $m$ outlets S1 to S$m$; the matrices MS1 to MSq each have $n$ inlets E1 to E$n$ and $m$ outlets S1 to S$m$. The multiple matrices MM1 to MMp are connected by their outlets to the inlets of the matrices MS1 to MSq in a regular cross-connected configuration as is known for connection systems, so that each multiple matrix MM1 to MMp is connected by at least one connection to each matrix MS1 to MSq.

FIG. 9 shows a matrix in which the inlets have been connected together in pairs, an odd inlet being connected with the even inlet which follows it. In this way a matrix with full availability for the paired inlets is obtained, with the result that the matrix then has half as many ($n/2$) distinct inlets and that each of these distinct inlets has access to all the $m$ outlets of the matrix. This particularity results from the connection mode between the inlets of the matrix and the inputs of the analogue multiplexers, as has been described with reference to FIG. 1. Of course, a double matrix or more generally a multiple matrix can also have full availability; to arrange this, it is sufficient for the inlets of each constituent matrix to be connected together in pairs as shown in FIG. 9.

FIG. 10 shows a matrix in which the outlets are connected together in pairs, an odd outlet being connected to the even outlet which follows it. A matrix with full availability is again obtained, with the result that the matrix thus has half as many ($m/2$) distinct outlets and that each of the $n$ inlets of the matrix has access to all the $n/2$ distinct outlets of the matrix. Of course, a double matrix or more generally a multiple matrix can also have full availability in this manner; to arrange this it is sufficient for the outlets of each constituent matrix to be connected together in pairs as shown in FIG. 10.

FIG. 11 shows another embodiment of a two-stage space concentrator; the matrices ME1 to MEp of the first stage each having $n$ inlets and $m$ outlets are identical to the matrix of FIGS. 2 or 3; the matrices MT1 to MTq have full availability because of paired outlets each having $n$ inlets and $m/2$ outlets and their structure is identical to the matrix of FIGS. 2 or 3. The distinct outlets of each matrix MT1 to MTq are referenced 01 to 0$m/2$. The connections between the matrices ME1 to MEp and MT1 to MTq form a regular cross-connected configuration. By way of an example, it will be assumed that $n = 32$, $p = 16$, $m$ then being equal to 16, $q = 8$; there are 8 outlets 01 to 08 per matrix MT1 to MTq; the concentration system therefore has $mp = 512$ inlets and $qm/2 = 64$ outlets and provides a concentration ratio of 8.

FIG. 12 shows a two-stage concentration system; the first stage is constituted by identical multiple matrices MA1 to MAp having full availability because of paired inlets, each having $nL/2$ distinct inlets I1 to I$nL/2$; the second stage is constituted by matrices MT1 to MTq having full availability because of paired outlets with $n$ inlets and $m/2$ outlets 01 to 0$m/2$. The connections between the multiple matrices MA1 to MAp and MT1 to MTq form a regular cross-connected configuration. By way of an example, each multiple matrix MA1 to MAp is constituted by two matrices having full availability (because of inlet pairing); each multiple matrix MA1 to MAp therefore has, where $n = 32$, 32 inputs I1 to I32; it will be assumed for example that $p = 16$, $m = 16$, $q = 8$; the matrices MT1 to MTq having full availability (because of outlet pairing) each has 8 outputs 01 to 08; the concentration system of FIG. 12 therefore has $p.nL/2 = 1024$ inlets and $q.m/2 = 64$ outlets and provides a concentration ratio of 16.

The pairing of inlets or outlets is a simple operation which can advantageously be done externally to a circuit board supporting a matrix. In such a case it will be appreciated that, regardless of whether they are used with their connections paired or not, individual matrix boards can be used interchangeably for high calling rate users (pairing), low calling rate users (no pairing) or a mixture of both. Thus the switching network described provides a versatile concentrator element that can be used in a two-stage concentrator at either stage and in portions of an exchange that deal with heavy or light traffic interchangeably. Such a "go-anywhere" element clearly has advantages from a maintenance point of view.

A matrix with all its inlets or all its outlets paired is functionally equivalent to a conventional matrix having cross-point switches at all cross-points. Such arrangements are more favourable for high density traffic as outlined above but less favourable for low density traffic. The switch described is equally at home in either situation.

Many modifications can be made to the system described; firstly if the multiplexers used are only capable of unidirectional transmission then a parallel deconcentration network must be provided (preferably using the same pattern of cross-points) for bothway telephone conversations. Similarly called parties could be reached over such a pair of concentration and deconcentration networks (or of course the same network used both for incoming and outgoing calls). Return speech paths can either be provided by equivalent matrices using selectors (i.e. demultiplexers) or by matrices having the same patterns of cross-points but using multiplexers arranged orthogonally to the ones shown (i.e. convert inlets to outlets) and with the multiplexers shown replaced by inlets, (equivalent orthogonal changes, but between space and time would then have to be made in the addressing of the multiplexer memories).

Arrays of reed relays could also be arranged according to the interconnection patterns (grading) described, but that would entail the bulk penalty discussed initially.

What we claim is:

1. A switching network comprising a matrix of cross-point switches disposed in a pattern at selected ones of the cross-points in an array of mutually orthogonal inlets and outlets; wherein the pattern of selected cross-points is built up from a rectangular array of basic layouts each comprising eight cross-point switches distributed among the sixteen cross-points formed by a group of four consecutive inlets crossing a row of four consecutive outlets, either the group of inlets or the row of outlets being disposed in four consecutively numbered lines; the basic layouts being of two types: a first type having its switches at the end cross-points of its odd numbered lines and at the inner cross-points of its even numbered lines, and a second type having its switches at its other cross-points; basic layouts of both types being disposed in a pattern over the array in such a manner that all the cross-point switches are arranged in a single matrix, the pattern of basic layout types being a binary pattern such that the matrix has a first line of alternating types of layout, a second line of alternating pairs of layout types and so on, each $n$-th line having at least one set of $2^{n-1}$ consecutive layouts of the same type, said lines in which the layouts are disposed being parallel to said four consecutively numbered lines within the layouts.

2. A switching network according to claim 1, wherein the last line is composed entirely of layouts of one type.

3. A switching network according to claim 1, wherein the lines of the matrix are constituted by rows of outlets and the lines of the basic layouts by their outlets.

4. A switching network according to claim 1, constituting a concentrator having a greater number of inlets than outlets.

5. A switching network according to claim 4 constituting a concentrator of 32 inlets by 16 outlets.

6. A switching network according to claim 1, wherein at least one pair of adjacent inlets are connected together to provide an effective single inlet having access to all the outlets.

7. A switching network according to claim 6, wherein all the inlets are so connected together in pairs that all the effective inlets have access to all the outlets.

8. A switching network according to claim 1, wherein at least one pair of adjacent outlets are connected together to provide an effective single outlet having access to all the inlets.

9. A switching network according to claim 8, wherein all the outlets are so connected together in pairs that all the effective outlets have access to all the inlets.

10. A switching network comprising a plurality of the switching networks of claim 1 connected with their outlets commoned together.

11. A switching network according to claim 1, wherein each outlet comprises a multiplexer having one output and half as many inputs as their are inlets to the matrix.

12. A switching network according to claim 11, wherein the multiplexers are in the form of integrated circuits including a plurality of analogue switches in the form of MOS transistors.

13. A two-stage switching network, wherein the switching network of each stage is constituted by the switching network of claim 1.

14. A two-stage switching network according to claim 13, where each matrix of cross-point switches is mounted as a separate plug-in module and all the matrices of the switching network are of the same design whereby a module can be used interchangeably in any position in the network, any commoning or pairing of outlets or inlets that may be required being accomplished external to the module.

* * * * *